United States Patent [19]
Kawagoe et al.

[11] Patent Number: 5,765,858
[45] Date of Patent: Jun. 16, 1998

[54] WHEEL SUSPENSION FOR REAR WHEELS

[75] Inventors: Kenji Kawagoe, Yokosuka; Takuya Murakami, Fujisawa; Masaharu Satou, Tokyo; Takaaki Uno, Atsugi; Hideo Aimoto, Zama; Tamiyoshi Kasahara, Fujisawa; Hiroshi Nagaoka, Tokyo, all of Japan

[73] Assignee: Nissan Motor Co., Ltd., Yokohama, Japan

[21] Appl. No.: 713,408

[22] Filed: Sep. 13, 1996

[30] Foreign Application Priority Data

Sep. 13, 1995 [JP] Japan ................................ 7-235614

[51] Int. Cl.$^6$ .................................................. B60G 3/00
[52] U.S. Cl. ........................ 280/701; 280/666; 280/724; 280/725
[58] Field of Search ........................ 280/666, 667, 280/668, 670, 690, 701, 724, 725, 726

[56] References Cited

U.S. PATENT DOCUMENTS

| | | | |
|---|---|---|---|
| 4,444,415 | 4/1984 | Von Der Ohe | 280/701 |
| 4,714,270 | 12/1987 | Rumpel | 280/690 |
| 4,840,396 | 6/1989 | Kubo | 280/690 |
| 4,984,818 | 1/1991 | Achleitner | 280/701 |
| 4,989,894 | 2/1991 | Winsor et al. | 280/690 |
| 5,228,717 | 7/1993 | Perkins | 280/668 |

FOREIGN PATENT DOCUMENTS 2-249712  10/1990  Japan.

Primary Examiner—Kenneth R. Rice
Attorney, Agent, or Firm—Foley & Lardner

[57] ABSTRACT

A rear wheel suspension arrangement for an automotive vehicle provides an axle housing rotatably mounting rear vehicular road wheels, each of the wheels having a wheel center. At each wheel, a radius rod which extends forwardly and inwardly, as viewed in a normal forward direction of the vehicle, is connected to the axle housing at a first articulated connection at a position lower than the wheel center. Further, a front lateral link, extending generally transversely to the forward direction of the vehicle is connected to the axle housing at a second articulated connection also located below the wheel center. In addition, a rear lateral link, positioned rearwardly of the front lateral link and extending in the traverse direction of the vehicle, is connected to the axle housing at a third articulated connection also located below the wheel center. The suspension structure also includes an upper arm having an articulated connection to the axle housing at a position above the wheel center. A coil spring is disposed between a lower side of a vehicle body and an upper surface of the rear lateral link, while a shock absorber having a coaxially mounted bump rubber provided at an upper side thereof is connected at an upper end thereof to the vehicle body and at a lower end thereof to a fourth articulated connection at an upper side of the axle housing.

53 Claims, 15 Drawing Sheets

WHEEL SUSPENSION FOR REAR WHEELS

BACKGROUND OF THE INVENTION

1. Field of the Invention

The present invention relates to a wheel suspension for rear wheels of an automotive vehicle.

2. Description of the Prior Art

Various suspensions have been proposed for rear wheels of an automotive vehicle for improving stability during cornering.

JAPA 2-249712 discloses a wheel suspension of the type wherein a coil spring is mounted around a shock absorber, while U.S. Pat. No. 4,444,415 discloses a wheel suspension of the type wherein a coil spring is separated from a shock absorber. Although not shown in these documents, it is the conventional practice to mount a bump rubber to the shock absorber coaxially to prevent excessive bounding of the wheel.

According to JP-A 2-249712 and U.S. Pat. No. 4,444,415, the known wheel suspensions comprise an axle housing or wheel carrier, a radius rod having an articulation point on the axle housing and extending forwardly and inwardly, a front lateral link extending generally transversely, with respect to the vehicle body, and having an articulation point on the axle housing, a rear lateral link extending generally transversely and disposed rearwardly of the front lateral link and having an articulation point on said axle housing at a height lower than the wheel center, and an upper arm having an articulation point on the axle housing at a height higher than the wheel center. A shock absorber and a coil spring are disposed on or supported by the rear lateral link. In other words, the shock absorber is not disposed on the axle housing. In the known wheel suspension, variation of suspension geometry is suppressed by absorbing a wind up moment imparted to the axle housing due to the shock absorber and the coil spring.

According to the known wheel suspension of the above kind, the coil spring, shock absorber and bump rubber all are arranged between the lateral link and the vehicle body. In order to prevent suppress wind up moment due to the coil spring, shock absorber and bump rubber, it is necessary to arrange an articulation point at which the rear lateral link is connected to the axle housing within a limited area around the wheel center so as to shorten the length of an arm so as to reduce the load applied to the axle housing.

If a distance $L_2$ between the wheel center and the articulation point of the rear lateral link on the axle housing is decreased, it is necessary to increase a distance $L_1$ between the wheel center and an articulation point of the front lateral link on the axle housing during cornering through rough terrain. The sum of $L_1$ and $L_2$ ($L_1+L_2$) should be sufficiently large to provide a good toe rigidity.

If the distance $L_1$ is larger than the distance $L_2$, the rear lateral link is subjected to greater force than the front lateral link is owing to lateral force applied to the wheel during cornering. This results in toe out condition at the outer wheel and toe in condition at the inner wheel during cornering, providing an oversteer condition. Thus, to keep an understeer condition during cornering, it is difficult to set the distance $L_2$ greater than the distance $L_1$.

Further, with regard to the structure of the known wheel suspension according to U.S. Pat. No. 4,444,415, the coil spring of relatively large radius can be arranged at a relatively low height, and this arrangement is advantageous in providing enough space for a vehicle rear trunk. According to the known arrangement disclosed in JP-A 2-249712, the coil spring of relatively large radius is arranged at a relatively high height. Thus, this arrangement is disadvantageous in providing enough space for a vehicle rear trunk.

An object of the present invention to provide a wheel suspension which provides, on one hand, improved steering stability and improved stability during cornering through rough terrain and, on the other hand, enough space for a vehicle rear trunk.

SUMMARY OF THE INVENTION

According to the present invention, there is provided a wheel suspension for rear wheels of an automotive vehicle having a vehicle body, comprising an axle housing rotatably carrying each of the rear wheels and having a wheel center;

a radius rod extending forwardly and inwardly, as viewed in a normal forward driving direction of the vehicle, and having a first articulation point on said axle housing at a position lower than said wheel center;

a front lateral link extending generally transversely with respect to the vehicle body, as viewed in the normal forward driving direction of the vehicle, and having a second articulation point on said axle housing at position lower than said wheel center;

a rear lateral link extending generally transversely and disposed rearwardly of said front lateral link, as viewed in the normal forward direction, and having a third articulation point on said axle housing at position lower than said wheel center;

an upper arm articulated to said axle housing at a position higher than said wheel center;

a spring disposed on said rear lateral link for bearing weight of the vehicle body;

a shock absorber, with a shock absorber logitudinal axis, having at a lower end portion thereof a fourth articulation point on said axle housing, said shock absorber having an upper end portion for connection to the vehicle body; and a bump rubber coaxially mounted to said shock absorber.

DETAILED DESCRIPTION OF THE INVENTION

Figure 1:
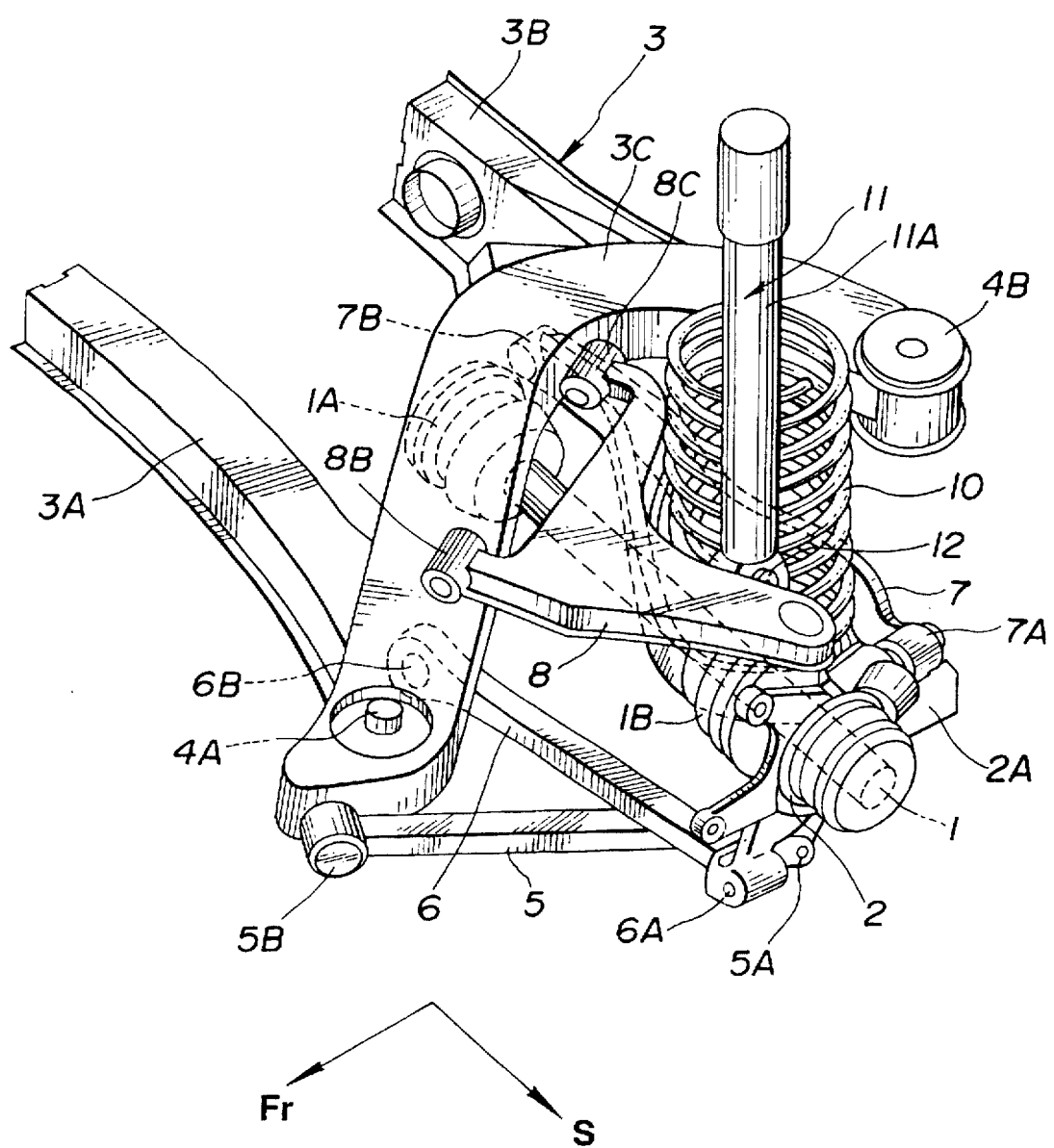
FIG. 1 is a perspective view of a first preferred embodiment of a wheel suspension for a rear left wheel of an automotive vehicle according to the present invention.

Referring to the drawings, various preferred embodiments according to the present invention are explained. Throughout the drawings, an arrow Fr is used to indicate a normal forward driving direction of an automotive vehicle, an arrow S is used to indicate a transverse outward direction with respect to the normal forward direction or the vehicle body, and an arrow U is used to indicate an upward diretion with respect to the vehicle body.

Referring to FIGS. 1 through 4, a first preferred embodiment according to the present invention is explained.

FIG. 1 is a perspective view of the structure of the first embodiment of a wheel suspension for a left side rear wheel of the automotive vehicle. Although the wheel suspension for the left side rear wheel is used for the following description, it will be noted that a wheel suspension for a right side rear wheel is identically formed.

The wheel suspension comprises an axle housing or wheel carrier 2 rotatably supporting an axle 1 extending transversely with respect to the vehicle. The axle 1 extends through the axle housing 2 and has an end portion projected outwardly of the axle housing 2. Fixedly coupled with this end portion are a wheel and a disc rotor, not shown. In this manner, the axle housing 2 rotatably supports the wheel. Via constant velocity universal joints 1A and 1B, the axle is driven by a final differential, not shown.

Arranged below the vehicle body is a suspension member generally designated by the reference numeral 3. The suspension member 3 includes tranevesely or laterally extending members 3A and 3B which are spaced in the normal forward driving direction to interpose therebetween the final differential. These transversely extending members 3A and 3B are connected at right side ends thereof to a side member on the right side, not shown, and at left side ends thereof to a side member 3C on the left side. The side members are connected to the vehicle body via resilient insulators at four points. Specifically, the side member 3C is connected at a front end portion to the vehicle body via a resilient insualtor 4A and at a rear end portion to the vehicle body via a resilient insulator 4B. These resilient insulators may be of a double layer cylindrical rubber type, for example.

The axle housing 2 is supported by a plurality of links, rod and arm.

Figure 2:
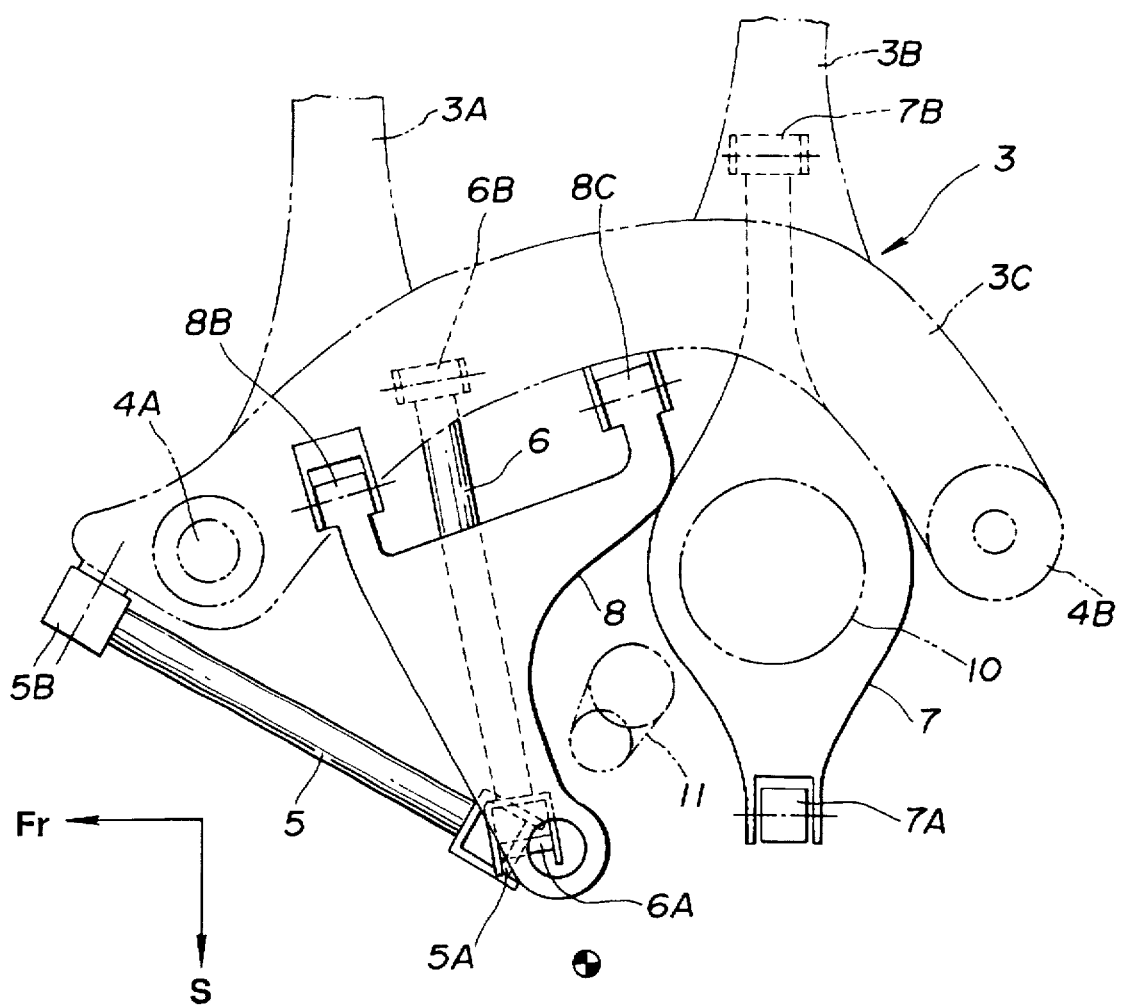
FIG. 2 is a schematic top plan view of the wheel suspension with unnessary parts or portions removed to illustrate arrangement of a radius rod, an upper arm, a front lateral link and a rear lateral link in association with a suspension member.
Figure 5:
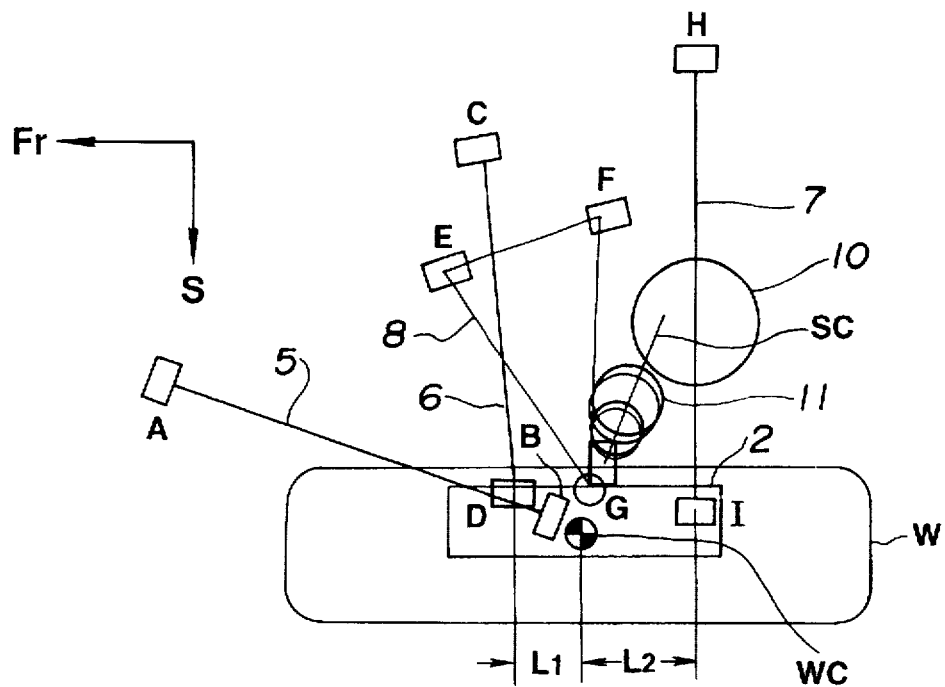
FIG. 5 is a schematic diagram of a top plan view of the wheel suspension.

In the top plan view shown in FIG. 2, the configuration and arrangement of links, rod and arm which are disposed between to interconnect the axle housing 2 and the suspension member 3 are illustrated. As is readily understood from FIGS. 1, 2, 5, 6 and 7, a radius rod 5 has an articulation point B on the axle housing 2 at a position lower than and forward of a wheel center WC and extends forwardly and inwardly, as viewed in the normal forward driving direction Fr or with respect to the vehicle body. As best seen in FIG. 5, the radius rod 5 has the opposite articulation point A on the side member 3C of the suspension member 3 (see FIG. 1). Specifically, via a resilient bushing 5A, the radius rod 5 is pivotally connected at the articulation point B to the axle housing 2 and, via a resilient bushing 5B, the radius rod 5 is pivotally connected at the opposite articulation point A to the side member 3C of the suspension member 3.

A front lateral link 6 has an articulation point D on the axle housing 2 at a position lower than and forward of the wheel center WC and lower than the articulation point B and extends generally transversely with respect to the normal forward driving direction Fr or the vehicle body. The front lateral link 6 has the opposite or inboard articlation point C on the transversely extending member 3A of the suspension member 3 (see FIG. 1). Via a resilient bushing 6A, the front lateral link 6 is pivotally connected at the articulation point D to the axle housing 2, and via a resilient bushing 6B, the front lateral link 6 is pivotally connected at the opposite articulation point C to the transversely extending member 3A.

As viewed in the normal forward driving direction Pr, a rear lateral link 7 is disposed rearwardly of the front lateral link 6. The rear lateral link 7 has an articulation point I on an integral arm 2A of the axle housing 2 at a position lower than and rearward of the wheel center WC and extends generally transversely. The rear lateral link 7 has the opposite or inboard articulation point B on the transversely extending member 38 of the suspension member 3. Via a resilient bushing 7A, the rear lateral link 7 is connected at the articulation pouint I to the axle housing 2, and via a resilient bushing 7B, the rear lateral link 7 is connected at the articulation point H to the transversely extending member 3B of the suspension member 3.

Pivot axes of the resilient bushings 5A and 5SB for the radius rod 5 are parallel and, as viewed in the normal forward driving direction in the plan view of FIG. 2 or 5, each of the pivot axes extends from a point disposed outwardly toward a point disposed rearwardly and inwardly. Pivot axes of the resilient bushings 6A and 6B for the front lateral link 6 are parallel and extend generally in the normal forward driving direction Fr. Pivot axes of the rear lateral link 7 are parallel and extend in the normal forward driving direction Fr. Each of these bushings 5A, 5B, 6A, 6B, 7A and 7B is of the dual-cylinder type.

Figure 3:
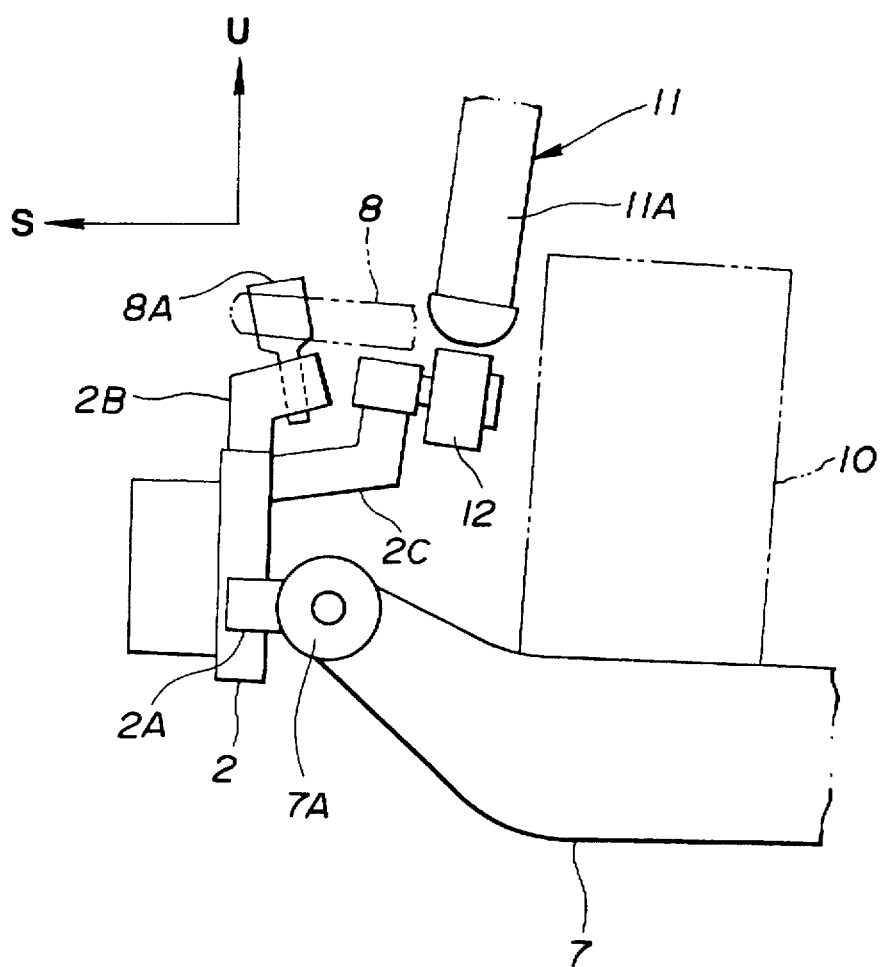
FIG. 3 is a diagrammatic rear end view of the wheel suspension with unnecessary parts or portions removed to illustrate points or portions at which the rear lateral link, a shock absorber and an upper arm are connected to an axle housing.
Figure 6:
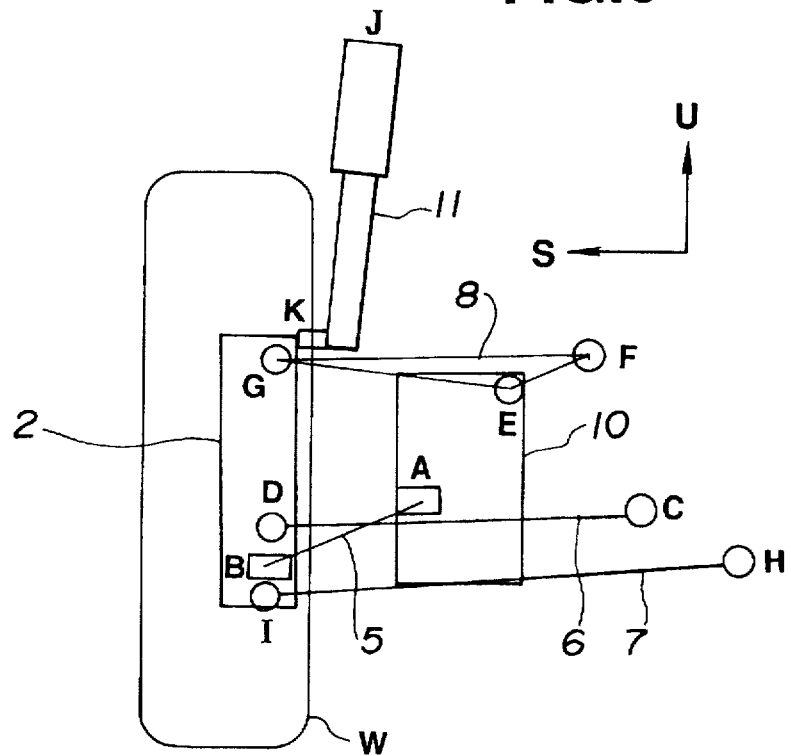
FIG. 6 is a schematic diagram of a rear view of the wheel suspensions
Figure 7:
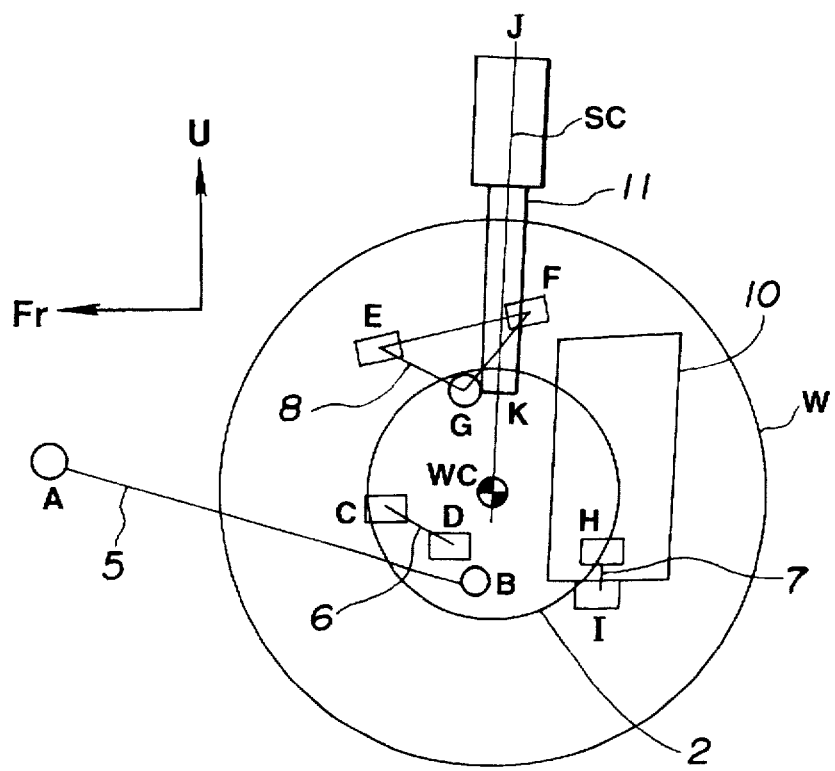
FIG. 7 is a schematic diagram of a side view of the wheel suspension.

As best seen in FIG. 3, the axle housing 2 has an integral upwardly projected arm 2B on which an upper arm 8 has an articulation point a (see FIGS. 5, 6 and 7). The articulation point G is located at a position higher than the wheel center WC. Via a ball joint BA, the upper arm 8 is articulated at the point G to the integral arm 2B of the axle housing 2. The upper arm 8 has a generally Y-shaped configuration including a curved rear edge for permitting operational space for a shock absorber 11 in the form of a hydraulic damper including a piston slidably disposed in a cylinder. The upper arm 8 has spaced front and rear inboard articulation points E and F on the side member 3C of the suspension member 3. Via pivots 8B and 8C including resilient bushings, the upper arm 8 is pivotally connected at the front and rear inboard articulation points E and F to the side member 3C of the suspension member 3. For minimizing undesired deformation of the resilient bushings, axes of the front and rear inboard pivots 8B and 8C are coaxially aligned. The front pivot 8B in located forwardly outwardly of the rear pivot 8C with respect to the normal forward direction Fr of the vehicle and the vehicle body.

As best seen in FIG. 2, the rear lateral link 7 has a substantially elliptical widened area upon which a coil spring 10 is suppoted or mounted. The coil spring 10 extends generally upwardly toward the vehicle body. In the conventional manner, the coil spring 10 is fixedly connected at an upper end thereof to the vehicle body to bear weight of the vehicle body. The weight of the vehicle body is supported via the coil spring 10 by the rear lateral link 7. The weight borne by the rear lateral link 7 is suppoted via the resilient bushing 7A, arm 2A, axle housing 2 and wheel by the road surface.

As seen in FIG. 3, the axle housing 2 has an integral arm 2C extending upwardly inwardly from an upper inward side thereof. The shock absorber 11 has at a lower end portion thereof an articulation point K on the arm 2C of the axle housing 2. At an upper end portion, the shock absorber 11 has a connection point J on the vehicle body (see FIG. 5). Via a resilient bushing 12, the shock absorber 11 is connected at the articulation point K to the arm 2C of the axle housing 2. The shock absorber 11 extends upwardly inwardly and slightly rearwardly.

Figure 4:
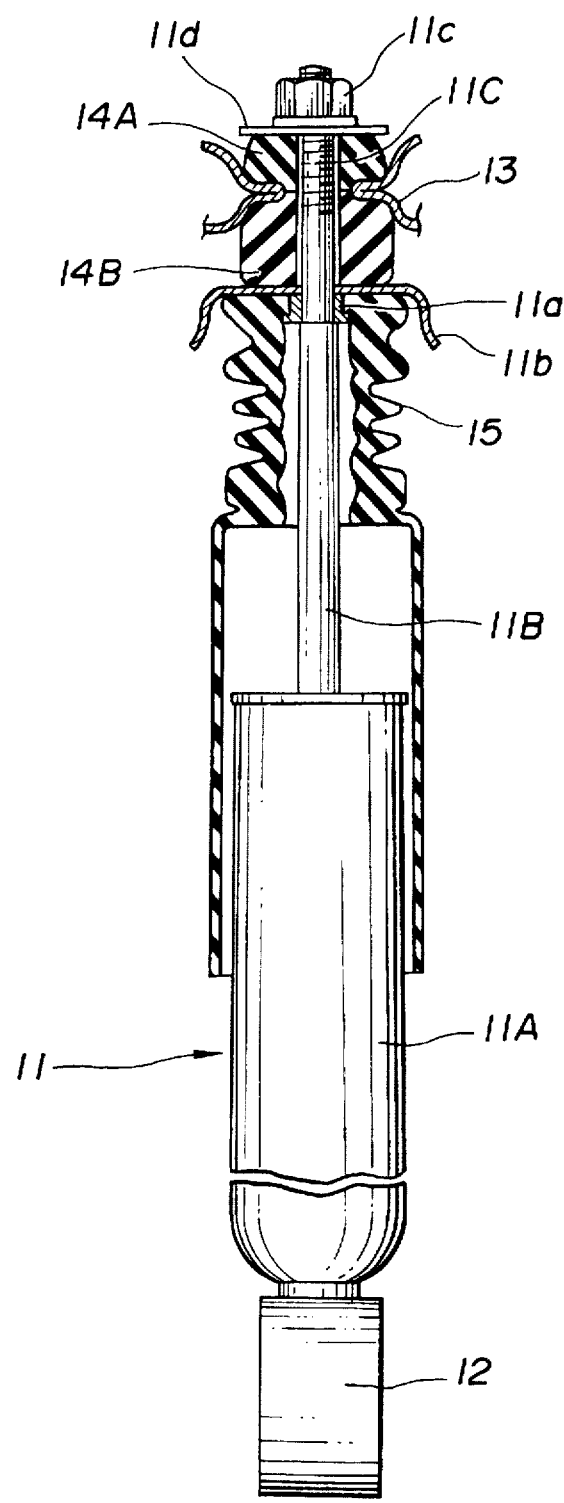
FIG. 4 is a plan view of the shock absorber partially broken away to show a bump rubber.

As shown in FIG. 4, the shock absorber 11 includes a piston rod 11B extending upwardly from an upper end of a cylinder 11A. The piston rod 11B has at an upper portion thereof a screw 11C formed with a thread. A bracket 11b is fitted on the screw 11C via a sleeve 11a. Between the bracket 11b and a washer lid of a nut 11c engaged with the screw 11C are resilient members 14A and 14B interposing therebetween a portion 13 of the vehicle body. This portion 13 is formed with an aperture through which the screw 11C passes. In mounting, the nut 11c in tightened after inserting the screw 11C through the portion 13 of the vehicle body and mounting the resilient member 14A and the washer 11d.

A bellows-like bump rubber 15 is provided between the upper end of the cylinder 11A and the bracket 11b. This bump rubber 15 is coaxially mounted to the shock absorber 11. Specifically, the bump rubber 15 has a bellows-like section surrounding the piston rod 11B in axially spaced relation to the upper end of the cylinder 11A and a sleeve section extending donwardly and surrounding the upper end portion of the cylinder 11A. Normally, the bellows-like section of the bump rubber 15 is out o contact with the upper end of the cylinder 11A, but the bellows-like section is compressed between the cylinder 11a and the bracket 11b to prevent direct contact of the cylinder 11A with the bracket 11b during excessive bounding of the wheel carried by the axle housing 2.

FIGS. 5 through 7 are schematic diagrams showing a top, rear and side views for explaining a structural relation between the components of the suspension of the first embodiment. For simplicity, in the following drawings; A represents a connection point between the radius rod 5 and the suspension member 3. B represents a connection point between the radius rod and the axle housing 2 and C represents a connection point between the forward lateral link 6 and the suspension member 3. D represents a connection point between the lateral link 6 and the axle housing 2. E refers to a connection point between the upper arm 8 and the suspension member 3. F represents the second connection between the upper arm 8 and the suspension member 3. G is a connection point between the upper arm 8 and the axle housing 2 and H is a connection point between the rear lateral link 7 and the suspension member 3. I represents a connection point between the rear lateral link 7 and the axle housing 2. J shows a connection point between an upper side of the shock absorber 11 and the vehicle body 13 while K represents a connection point between a lower side of the shock absorber 11 and the axle housing 2. WC represents a center point of a wheel W in relation the the surrounding suspension geometry. L1 represents a distance between the wheel center WC and the connection point D while L2 represents a distance between the wheel center WC and the connection point 1.

According to the above disclosed arrangement, the distance L2 is established to be larger than the distance L1.

As may be seen in FIGS. 5 and 7, viewing said axle housing 2 from a side or transverse direction with respect to the normal forward driving direction Fr of the vehicle, the mounted shock absorber 11 according to the invention is disposed such that a line SC, extended downwardly along a longitudinal axis of the shock absorber 11, is oriented to pass through a predetermined limited area about said wheel center WC.

Hereinbelow the functioning of the suspension structure according to the invention as described hereinabove will be described in detail.

Figure 8A:
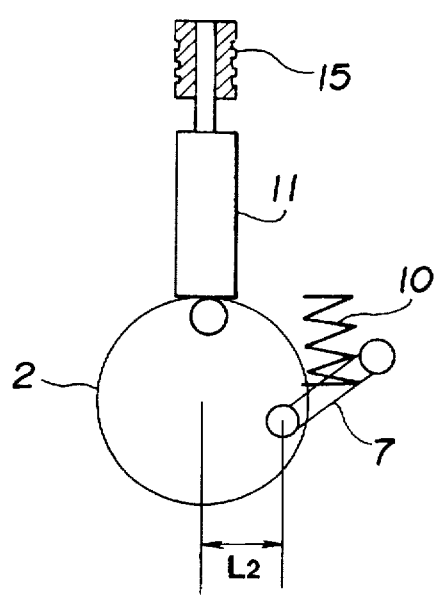
FIG. 8(a) is a diagram illustrating the installation of the shock absorber employed in the wheel suspension according to the present invention.

As may be seen in FIG. 8(a) the vehicle body weight is supported on the coil spring 10 disposed on the rear lateral link while the longitudinal axis SC of the shock absorber and coaxially mounted bump rubber 15 are supported at the articulation point 12 (i.e. connection point K) at the upper side of the axle housing 2.

According to this structure, a so-called 'wind up moment' or moment of the coil spring 10 disposed on the upper surface of the rear lateral link 7 is applied to the axle housing 2 independently. That is, compression and/or expansion stroke of the shock absorber, bump rubber etc. do not affect wind up forces applied to the axle housing 2 by the coils spring 10 via the rear lateral link 7 at the articulation point 2A (i.e. connection point I).

Figure 8B:
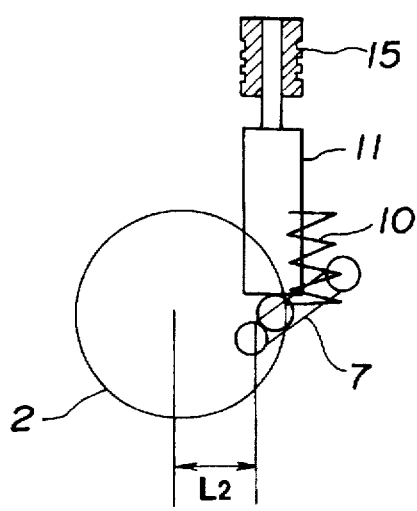
FIG. 8(b) is a diagram illustrating the conventional installation of a shock absorber employed by the known wheel suspensions explained is before.

Referring now to the conventional structure shown in FIG. 8(b), a wind up moment applied to the axle housing, input at the connection point I of the shock absorber, is the product of the combined action of the coil spring 10, the shock absorber 11 and the bump rubber 15 on the rear lateral link 7.

Figure 9:
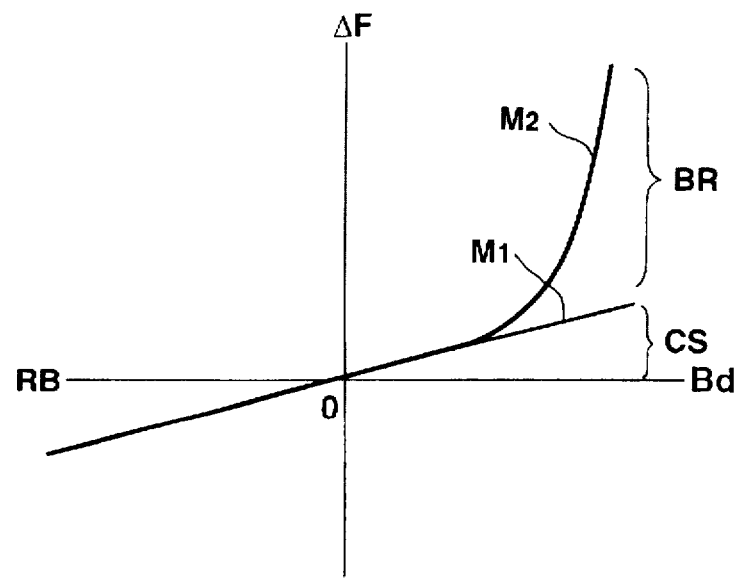
FIG. 9 is a graph illustrating a relation between suspension stroke and axle load delta F.

As may be seen in FIG. 9 a relation between suspension stroke and axle load FΔ variation according to the invention is established via an arrangement by which the coil spring 10 is supported solely on the rear lateral link 7 (FIG. 8(a)) while the shock absorber 11 is separately supported on the articulation point 12 formed on the axle housing 2. According to this, linear suspension stroke characteristics nay be reliably obtained.

However, in the conventional structure of FIG. 8(b) wherein the spring force of the bump rubber 15, for example, is also applied to the rear lateral link 7, inevitably, axle load FΔ variation is increased in a non linear manner, as shown by the line M2 in the graph of FIG. 9.

Figure 10:
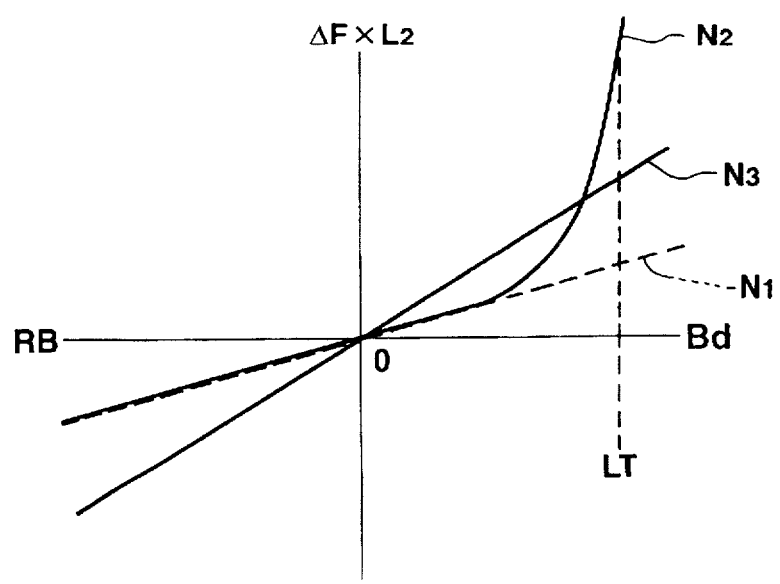
FIG. 10 is a graph showing a relation between suspension stroke and wind up moment.

FIG. 10 is a graph showing a relation between suspension stroke and axle load variation FΔ in relation to the distance L2 according to the suspension of the first embodiment. As may be seen wind up moment input to the axle housing 2 from the rear lateral link 7 in accordance with axle load variation FΔ according to the distance L2 as established in FIG. 8(a), axle load variation FΔ such as shown by N1 of FIG. 10 may be obtained.

On the other hand, referring again to the conventional arrangement of FIG. 8(b), characteristics such as shown by N2 of FIG. 10 result. In a condition where bounding is large, to great a wind up moment is applied to the axle housing 2 according to the additional spring force generated at the bump rubber 15. For example, such condition may cause an unfavorably large angle to be formed between the resilient connection 7A and the axle housing 2. According to the structure of FIG. 8(b) it is not possible to significantly increase the size of the distance L2.

As is evident from the above description of the present embodiment, when a large degree of bounding is present, substantially linear response characteristics are inherently maintained, as shown by N3 in FIG. 10.

Also, while maintaining an appropriate limit of bounding stroke during cornering LT, a structural width of the present suspension structure may be reduced as compared with the prior art.

Further, when a total width L1+L2 may be established as sufficiently large, a large distance L1 is not particularly required according to the invention.

Figure 11:
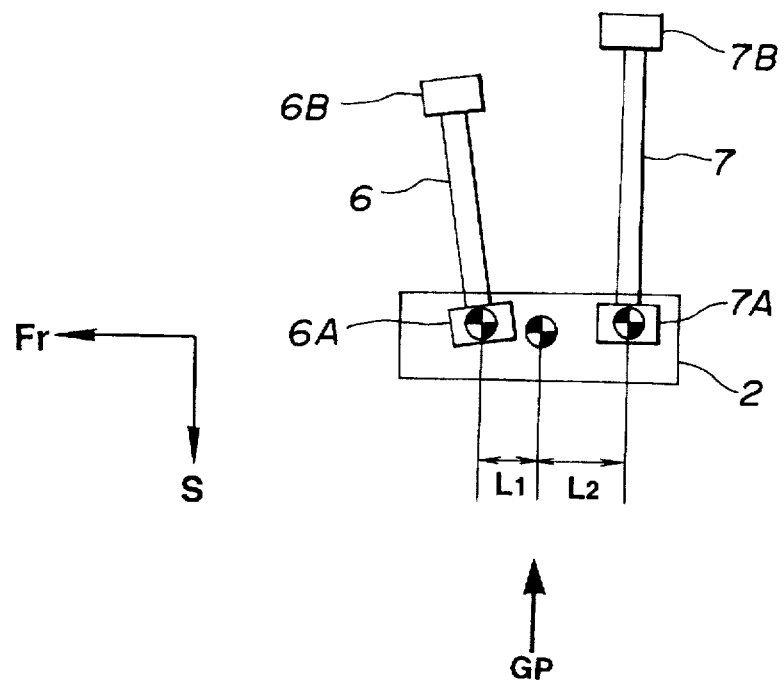
FIG. 11 is a diagram for explaining toe angle variation according to the wheel suspension of the invention.

FIG. 11 is a diagram for explaining toe angle 6 variation according to the suspension structure of the invention Referring to FIG. 11, it may be seen that a lateral offset angle of the front lateral link 6 is greater than that of a rear lateral link 7. Further, the distance L2 is maintained greater than L1. According to this toe in of the outer wheel and toe out of the inner wheel is established during cornering.

In addition, since high toe rigidity is established according to the invention, torque variation at a point at which the wheel contacts a road surface may be held small.

Figure 12A:
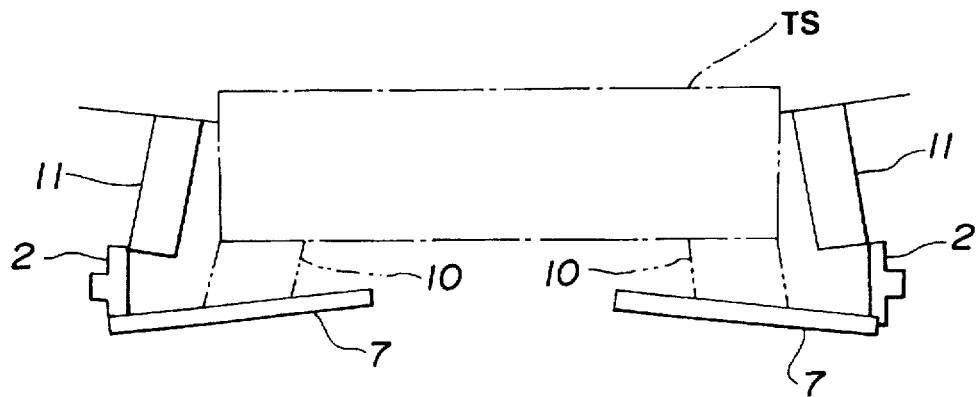
FIGS. 12(a) and 12(b) are diagrams showing an available trunk space according to intsllation of wheel suspension of the present invention and that according to the intsllation of the known wheel suspension discussed before.
Figure 12B:
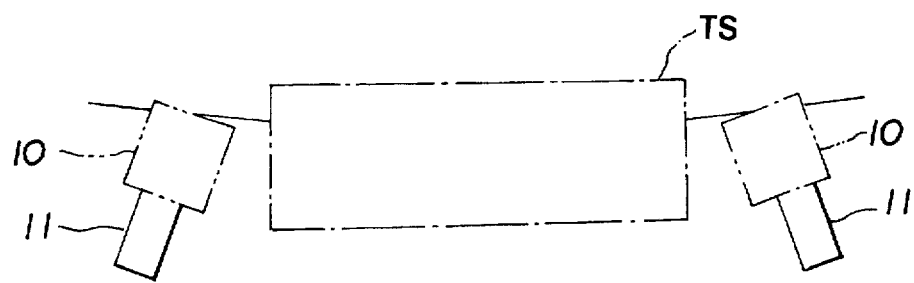
Figure 13:
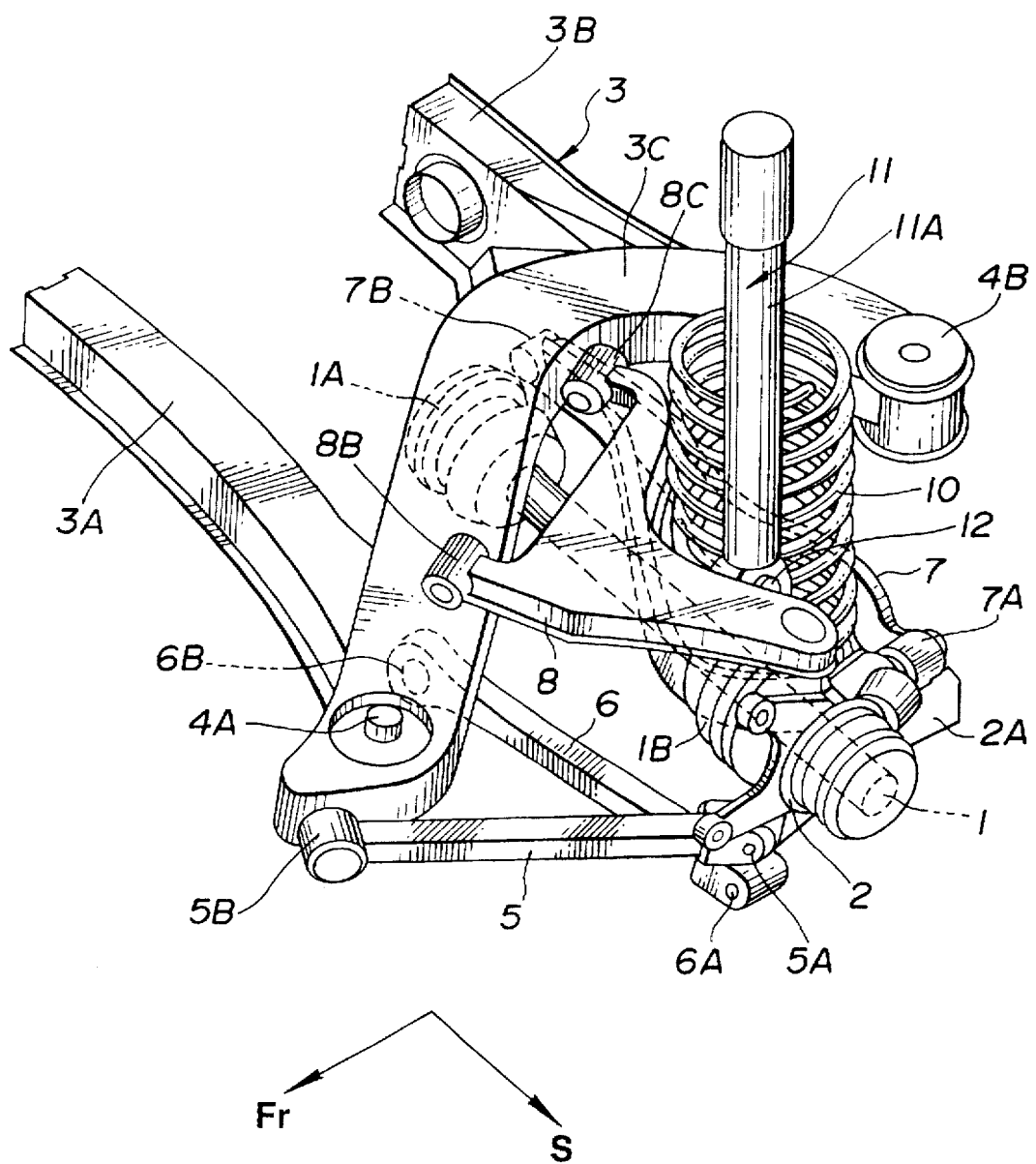
FIG. 13 is a perspective view of a second embodiment of a wheel suspension according to the present invention.

Further, according to the structure of the invention, as seen in FIGS. 12 (a) and (b) which respectively show available trunk space according to installation of the suspension of the invention and a conventional suspension arrangement. Since the coil springs 10 are supported solely on the rear lateral links 7, 7, a mounting position of the shock absorbers may be moved outward, greatly increased trunk space TS may be obtained with no loss of performance.

FIGS. 13 to 16 will now be referred to for explaining a vehicular wheel suspension according to a second preferred embodiment of the invention.

According to the structure of the second embodiment, an articulated connection 5A between the radius rod 5 and the axle housing 2 is set to be above articulated connection 6A between the front lateral link 6 and the axle housing 2.

Figure 14:
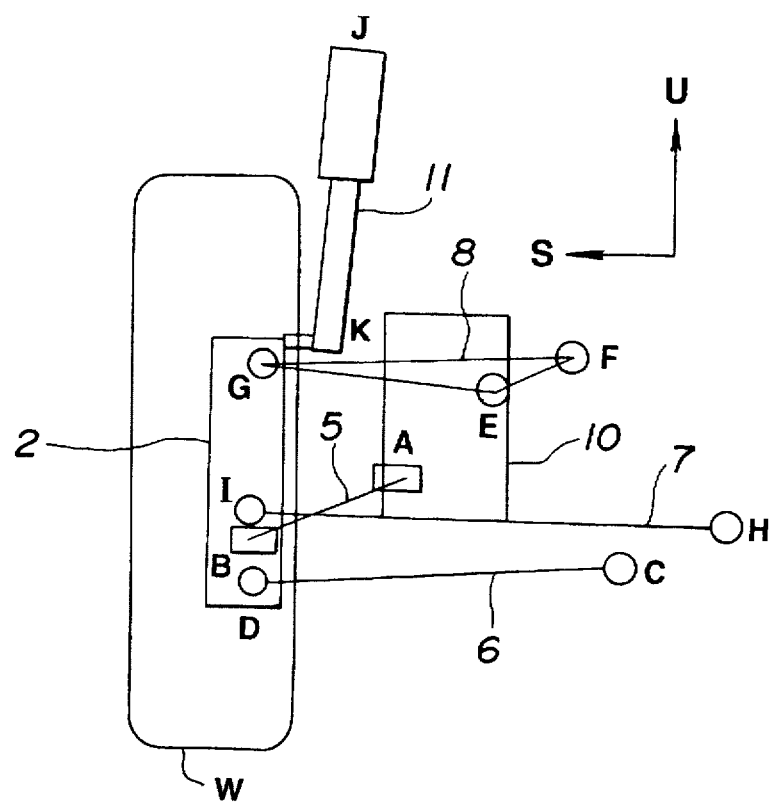
FIG. 14 is a schematic diagram of a rear view of the second embodiment.
Figure 15:
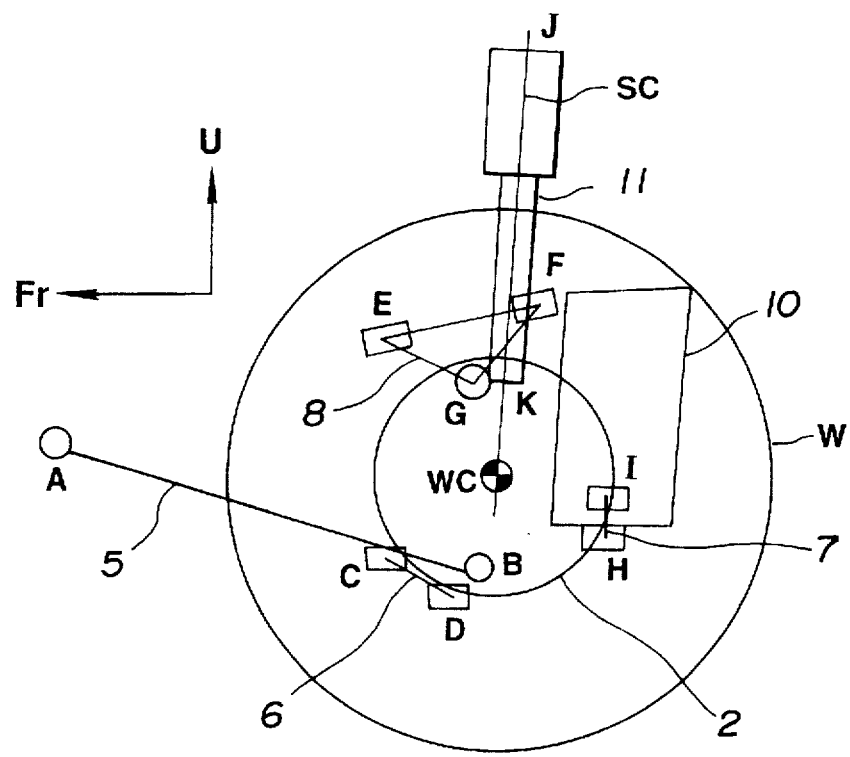
FIG. 15 is a schematic diagram of a side view of the second embodiment.

As may be seen in FIG. 14, the lateral height of the rear lateral link 7 is set to be higher than that of the front lateral link 6. Compare the positional relationships of the front and rear lateral links 6 and 7 in FIGS. 6 and 7 with those of FIGS. 14 and 15.

Figure 16:
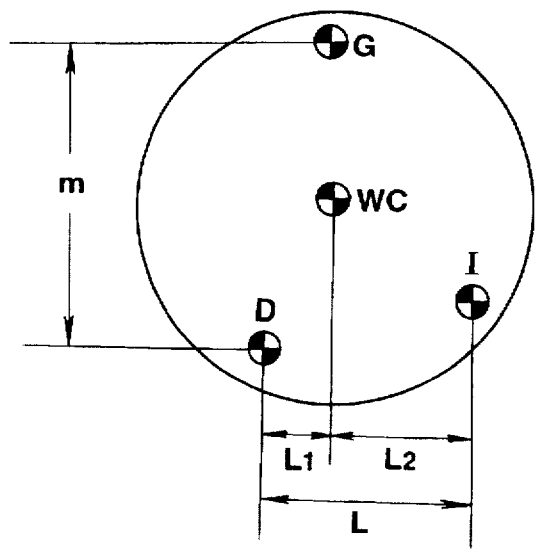
FIG. 16 is a schematic diagram showing relation between various connection points on the axle housing.

Referring now to FIG. 16, a schematic diagram showing a positional relation between resilient connection points on an axle housing according to the second embodiment. According to this, a distance L2 is established which is significantly larger than the distance L1. Further a distance m between the connection G between the upper arm 8 and the upper side of the axle housing 2 and the connection D between the front lateral link 6 and the lower side of the axle housing 2 has been established to be larger than the total distance L in the vertical direction. This provides increased camber rigidity while maintaining sufficient toe rigidity.

Figure 17:
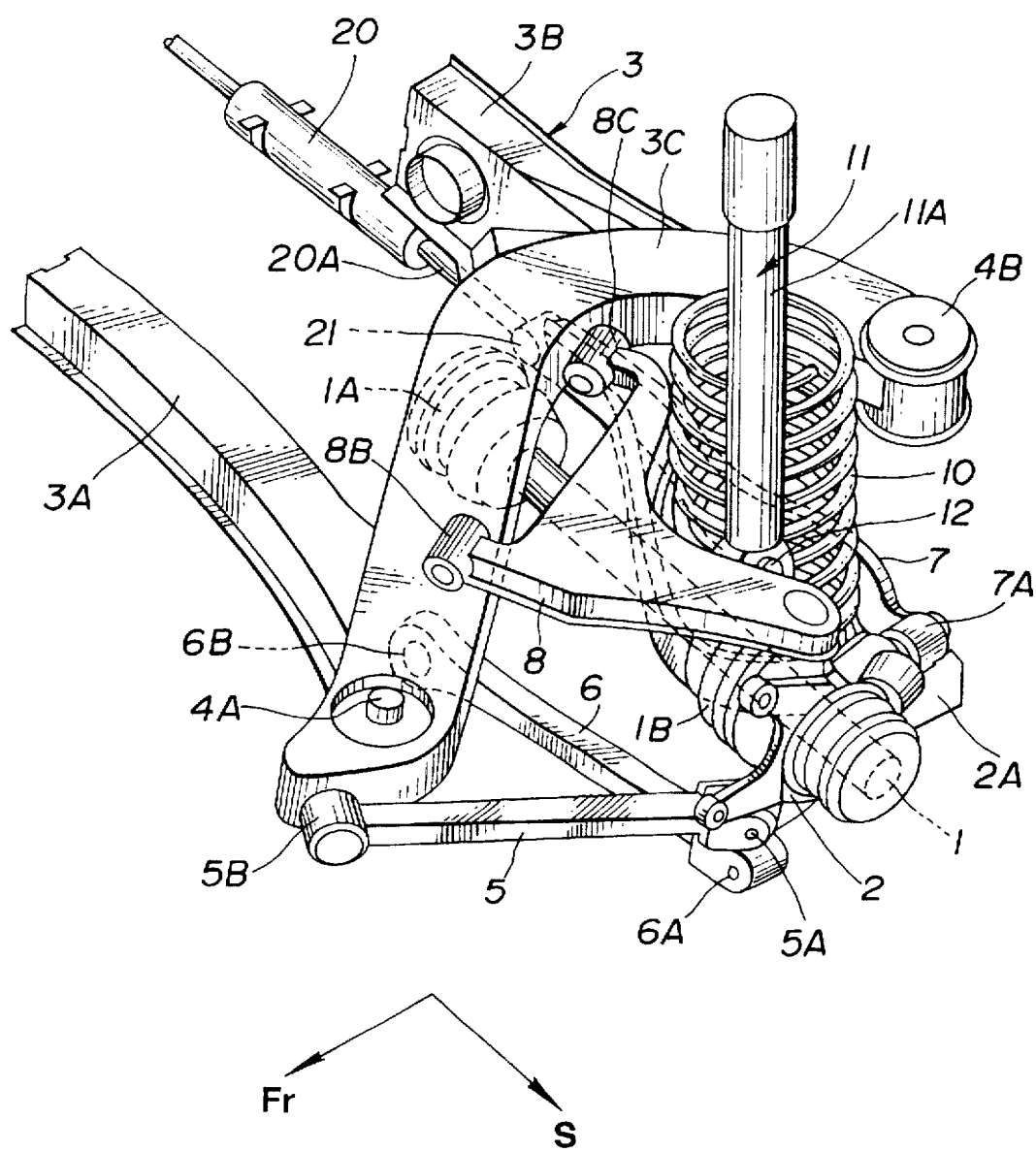
FIG. 17 is a perspective view of a third embodiment of a wheel suspension according to the present invention.

FIG. 17 shows a perspective view of a vehicular wheel suspension according to a third preferred embodiment of the invention. As may be appreciated, the present embodiment is substantially identical in structure of the above described second embodiment. However, in the present structure the pivotal connection between the inner end of the rear lateral link 7 and the rear lateral component 3B of suspension member 3 is provided with an actuator such as a power cylinder 20 enabling reciprocating movement of said pivotal connection in the lateral direction of said vehicle according to a piston rod 20a controllably movable via the power cylinder 20 and a ball joint 21 disposed between the piston rod 20a and the inner side of the rear lateral link 7. This allows pivotal movement of the rear lateral link. This allows sufficient steering angle to be obtained with substantially low actuator force. Thus the present embodiment may be preferrably utilized for vehicles having rear wheel steering arrangements, or the like.

Figure 18:
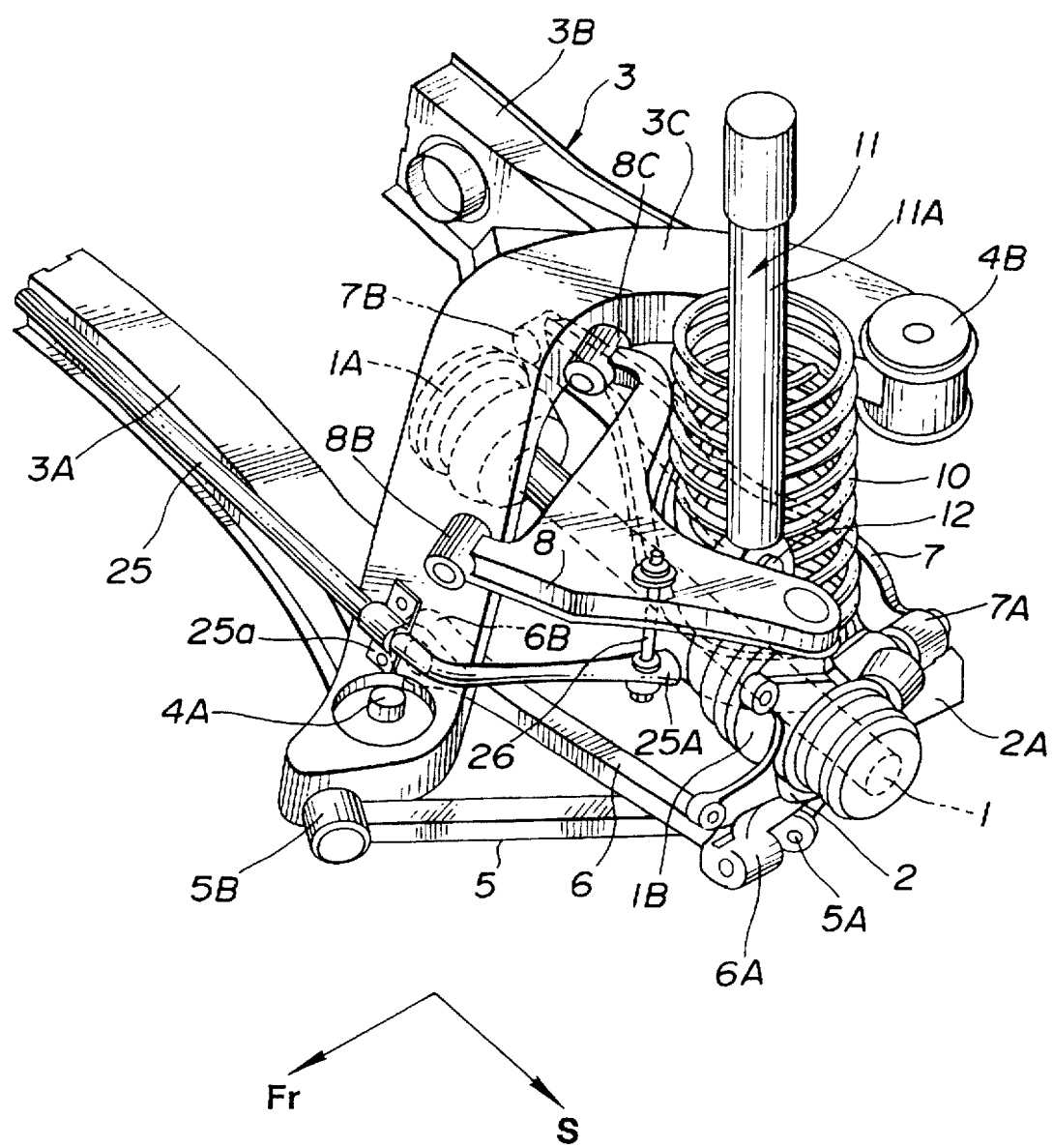
FIG. 18 in a perspective view of a fourth embodiment of a wheel suspension according to the present invention.

FIG. 18; shows a perspective view of a fourth preferred embodiment of a vehicular rear wheel suspension according the invention. It will be noted from the drawing that the structure of the present embodiment is substantially the same as that of the above described first embodiment. In addition, a stabilizer 25 disposed between the front lateral link 6, attached via a bracket 25a to the longitudinal suspension component 3C (or, alternatively, a portion of the vehicle body). An outer end of the stabilizer 25 is rotatably held by a bracket 25A to be linked by a vertical compression rod 26 to a position on the upper arm 8. The outer side of the stabilizer 25 is arranged at a position forward of a wheel center WC position on the axle housing 2 at which input forces are conveyed to said axle housing 2.

Figure 19A:
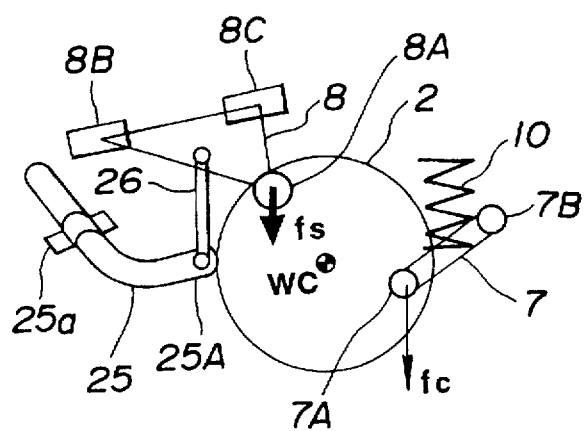
FIGS. 19(a) and 19(b) are schematic diagrams respectively showing the wheel suspension utilizing a stabilizer.

FIGS. 19 (a), (b) are schematic diagrams respectively showing an essential portion of the suspension arrangement of the fourth embodiment including operation of a stabilizer portion thereof. As may be seen the upper arm applies and input force fs from the upper arm 8 to the axle housing 2 in a first direction while the coil spring 10 via the lateral link inputs a second force fc in the opposite direction, relative to the wheel center WC. However, according to provision of the stabilizer 25, a wind up moment at the axle housing 2 is held small and even though the distance L2 may be established to be quite large and sufficient toe rigidity of suspension performance is obtained.

In other words, when a force applied to said axle housing via the action of said coil spring 10 produces a moment about the wheel center WC in a first rotational direction, the stabilizer 25 is operable so as to apply a reaction force to the axle housing for producing a moment about said wheel center in a second rotational direction opposite the first rotation direction.

In addition connection of the stabilizer 25 to the main suspension structure may be achieved by a simple connection between the stabilizer and a portion of the upper arm 8.

Figure 20:
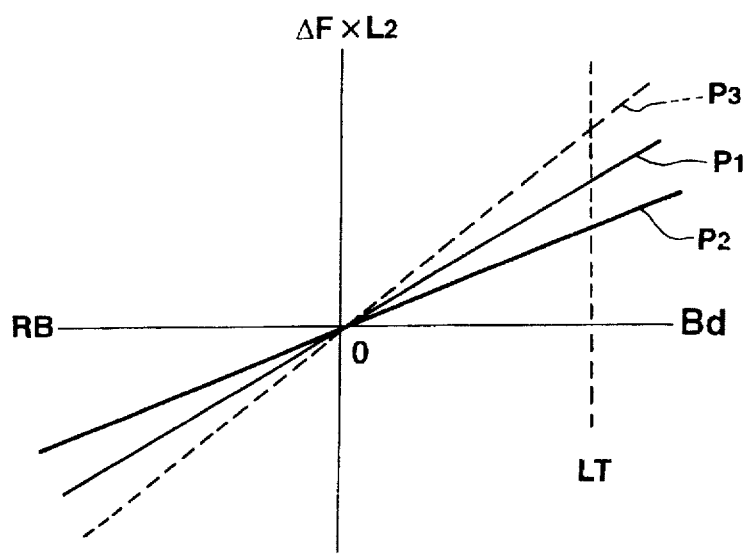
FIG. 20 is a graph similar to FIG. 10.

FIG. 20 is a graph showing a connection between suspension stroke and a wind up moment in a suspension according to the fourth embodiment. According to the above structure, substantially linear response as shown by P1 may be established. If the input force fs of the stabilizer 25 is reduced characteristics such as shown by P2 may be obtained.

Figure 19B:
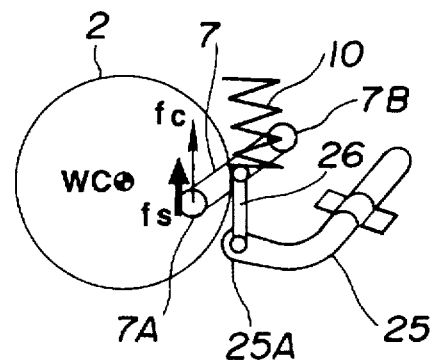

As may be appreciated from FIG. 19(b), when the forces fs and fc in the same direction are applied to the wheel center WC characteristics such as shown by P3 of FIG. 20 allow fast response of the suspension.

Figure 21:
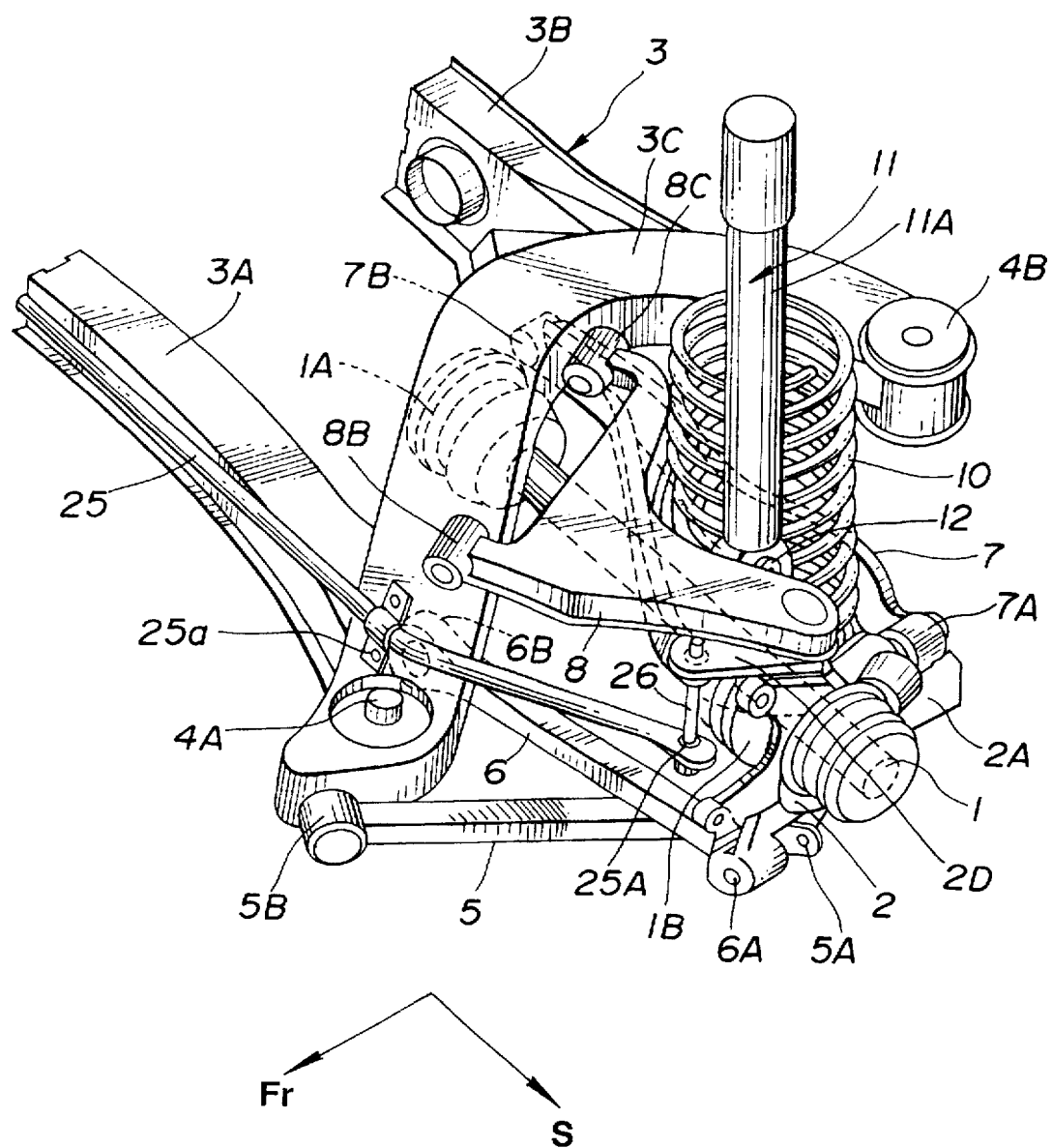
FIG. 21 is a perspective view of a fifth embodiment of a wheel suspension according to the present invention.

FIG. 21 shows a perspective view of a fifth preferred embodiment of a vehicular rear wheel suspension comprising an alternative mounting arrangement for a stabilizer 25 structure thereof. According to this structure an separate arm portion 2D is provided for mounting the compression rod 26 of the stabilizer. According to this forces applied from the upper arm 8 and rear lateral link 7 are in different directions and the same advantages as the previous embodiment are obtained.

Thus, according to the present invention as described herein above, there is provided a suspension arrangement for an automotive vehicle in which sufficiently rigid toe and camber characteristics may be assured.

It will be noted that, although the preferred embodiment is set forth in terms of a rear wheel suspension for an automotive vehicle, the present invention may be embodied in various different ways without departing from the principle of the invention as herein set forth.

What is claimed is:

1. A wheel suspension for rear wheels of an automotive vehicle having a vehicle body, comprising:

an axle housing rotatably carrying each of the rear wheels and having a wheel center;

a radius rod extending forwardly and inwardly, as viewed in a normal forward driving direction of the vehicle, and having a first articulation point on said axle housing at a position lower than said wheel center;

a front lateral link extending generally transversely with respect to the vehicle body, as viewed in the normal forward driving direction of the vehicle, and having a second articulation point on said axle housing at position lower than said wheel center;

a rear lateral link extending generally transversely and disposed rearwardly of said front lateral link, as viewed in the normal forward direction, and having a third articulation point on said axle housing at position lower than said wheel center;

an upper arm articulated to said axle housing at a position higher than said wheel center;

a spring disposed on said rear lateral link for bearing weight of the vehicle body;

a shock absorber, with a shock absorber logitudinal axis, having at a lower end portion thereof a fourth articulation point on said axle housing, said shock absorber having an upper end portion for connection to the vehicle body; and a bump rubber coaxially mounted to said shock absorber.

2. A wheel suspension as set forth in claim 1, wherein said shock absorber is so arranged as to provide an arrangement wherein, viewing said axle housing in a transverse direction with respect to the normal forward driving direction of the automotive vehicle, a distance between an imaginary line passing through said shock absorber longitudinal axis and said wheel center is shorter than a distance between said third arcitulation point, at which said rear link is connected to said axle housing and said wheel center.

3. A wheel suspension as set forth in claim 1, wherein said shock absorber is so arranged as to provide an arrangement wherein, viewing said axle housing in a transverse direction with respect to the normal forward driving direction of the automotive vehicle, an imaginary lne passing through said shock absorber longitudinal axis passes through a predetermined limited area about said wheel center.

4. A wheel suspension as set forth in claim 1, wherein said second articulation point, where said front lateral link is connected to said axle housing, is located at a height lower than a height at which said third articulation point, where said rear lateral link is connected to said axle housing, is located.

5. A wheel suspension as set forth in claim 2, wherein said second articulation point, where said front lateral link is connected to said axle housing, is located at a height lower than a height at which said third articulation point, where said rear lateral link is connected to said axle housing, is located.

6. A wheel suspension as set forth in claim 3, wherein said second articulation point, where said front lateral link is connected to said axle housing, is located at a height lower than a height at which said third arciulation point, where said rear lateral link is connected to said axle housing, is located.

7. A suspension as set forth in claim 1, wherein said first articulation point, where said radius rod is connected to said axle housing, is located at a height higher than a height at which said second arriculation point, where said front lateral link is connected to said axle housing, is located.

8. A wheel suspension as set forth in claim 2, wherein said first articulation point, where said radius rod is connected to said axle housing, is located at a height higher than a height at which said second articulation point, where said front lateral link is connected to said axle housing, is located.

9. A wheel suspension as set forth in claim 3, wherein said first articulation point, where said radius rod is connected to said axle housing, is located at a height higher than a height at which said second arciulation point, where said front lateral link is connected to said axle housing, is located.

10. A wheel suspension as set forth in claim 4, wherein said first articulation point, where said radius rod is connected to said axle housing, is located at a height higher than a height at which said second articulation point, where said front lateral link is connected to said axle housing, is located.

11. A rear suspension as set forth in claim 5, wherein said first arciulation point, where said radius rod is connected to said axle housing, is located at a height higher than a height at which said second articulation point, where said front lateral link is connected to said axle housing, is located.

12. A wheel suspension as set forth in claim 6, wherein said first arciulation point, where said radius rod is connected to said axle housing, is located at a height higher than a height at which said second articulation point, where said front lateral link is connected to said axle housing, is located.

13. A wheel suspension as set forth in claim 1, wherein an actuator is provided for positioning said rear lateral link in a transverse direction as viewed in the normal forward direction of the vehicle.

14. A wheel suspension as set forth in claim 2, wherein an actuator is provided for positioning said rear lateral link in the transverse direction of the vehicle.

15. A wheel suspension as set forth in claim 3, wherein an actuator is provided for positioning said rear lateral link in the transverse direction of the vehicle.

16. A wheel suspension as set forth in claim 4, wherein an actuator is provided for positioning said rear lateral link in the transverse direction of the vehicle.

17. A wheel suspension as set forth in claim 5, wherein an actuator is provided for positioning said rear lateral link in the transverse direction of the vehicle.

18. A wheel suspension as set forth in claim 6, wherein an actuator is provided for positioning said rear lateral link in the transverse direction of the vehicle.

19. A wheel suspension as set forth in claim 7, wherein an actuator is provided for positioning said rear lateral link in the transverse direction of the vehicle.

20. A wheel suspension as set forth in claim 8, wherein an actuator is provided for positioning said rear lateral link in the transverse direction of the vehicle.

21. A wheel suspension as set forth in claim 9, wherein an actuator is provided for positioning said rear lateral link in the transverse direction of the vehicle.

22. A wheel suspension as set forth in claim 10, wherein an actuator is provided for positioning said rear lateral link in the transverse direction of the vehicle.

23. A wheel suspension as set forth in claim 11, wherein an actuator is provided for positioning said rear lateral link in the transverse direction of the vehicle.

24. A wheel suspension as set forth in claim 12, wherein an actuator is provided for positioning said rear lateral link in the transverse direction of the vehicle.

25. A wheel suspension as set forth in claim 1, wherein a stabilizer is so arranged as to provide an asrrangement wherein a force applied to said axle housing due to action of said spring produces a moment about said wheel center in a first rotational direction and a reaction force applied to said axle housing due to action of said stablizer produces a moment about said wheel center in a second rotational direction opposite to said first rotational direction.

26. A wheel suspension as set forth in claim 1, wherein a stablizer has a fifth articulation point on said axle housing and is arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

27. A wheel suspension as set forth in claim 2, wherein a stablizer has a fifth articulation point on said axle housing and is arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

28. A wheel suspension as set forth in claim 3, wherein a stablizer has a fifth articulation point on said axle housing and is arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

29. A wheel suspension as set forth in claim 4, wherein a stablizer has a fifth articulation point on said axle housing and is arranged such that, when a force is applied to said axle housing owing to action of said spring, said stabilizer is stressed to apply a reaction force to said axle housing at said fifth articulation point located forwardly of said wheel center an viewed in the nomral forward direction of the vehicle.

30. A wheel suspension as set forth in claim 5, wherein a stablizer has a fifth articulation point on said axle housing and is arranged such that, when a force in applied to said axle housing owing to action of said spring, said stabilizer is stressed to apply a reaction force to said axle housing at said fifth articulation point located forwardly of said wheel center as viewed in the nomral forward direction of the vehicle.

31. A wheel suspension as set forth in claim 6, wherein a slablizer has a fifth articulation point on said axle housing and is arranged such that, when a force is applied to said axle housing owing to action of said springs said stabilizer is stressed to apply a reaction force to said axle housing at said fifth articulation point located forwardly of said wheel center as viewed in the nomral forward direction of the vehicle.

32. A wheel suspension as set forth in claim 7, wherein a stablizer has a fifth articulation point on said axle housing and is arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

33. A wheel suspension as set forth in claim 8, wherein a stablizer has a fifth articulation point on said axle housing and is arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

34. A wheel suspension as set forth in claim 9, wherein a stablizer has a fifth articulation point on is said axle housing and is arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

35. A wheel suspension as set forth in claim 10, wherein a stablizer has a fifth articulation point on said axle housing and is arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

36. A wheel suspension as set forth in claim 11, wherein a stablizer has a fifth articulation point on said axle housing and is arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

37. A wheel suspension as set forth in claim 12, wherein a stablizer has a fifth articulation point on said axle housing and is arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

38. A wheel suspension as set forth in claim 13, wherein a stablizer has a fifth articulation point on said axle housing and is arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

39. A wheel suspension as set forth in claim 14, wherein a stablizer has a fifth articulation point on said axle housing and is arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

40. A wheel suspension as set forth in claim 15, wherein a stablizer has a fifth articulation point on said axle housing and is arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

41. A wheel suspension as set forth in claim 16, wherein a stablizer has a fifth articulation point on said axle housing and is arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

42. A wheel suspension as set forth in claim 17, wherein a stablizer has a fifth articulation point on said axle housing and is arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

43. A wheel suspension as set forth in claim 18, wherein a stablizer has a fifth articulation point on said axle housing and is arranged such that, when a force is applied to said axle housing owing to action of said spring, said stabilizer is stressed to apply a reaction force to said axle housing at said fifth to articulation point located forwardly of said wheel center an viewed in the nomral forward direction of the vehicle.

44. A wheel suspension as set forth in claim 19, wherein a stablizer has a fifth articulation point on said axle housing and is arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

45. A wheel suspension as set forth in claim 20, wherein a stablizer has a fifth articulation point on said axle housing and is arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

46. A wheel suspension as set forth in claim 21, wherein a stablizer has a fifth articulation point on said axle housing and is arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

47. A wheel suspension as set forth in claim 22, wherein a stablizer has a fifth articulation point on said axle housing and is arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

48. A wheel suspension as set forth in claim 23, wherein a stablizer has a fifth articulation point on said axle housing and is arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

49. A wheel suspension as set forth in claim 24, wherein a stablizer has a fifth articulation point on said axle housing and is arranged such that, when a force is applied to said axle housing owing to action of said spring, said stabilizer is stressed to apply a reaction force to said axle housing at said fifth articulation point located forwardly of said when center an viewed in the nomral forward direction of the vehicle.

50. A wheel suspension for rear wheels of an automotive vehicle having a vehicle body, comprising:
   an axle housing rotatably carrying each of the rear wheels and having a wheel center;
   a radius rod extending forwardly and inwardly, as viewed in a normal forward driving direction of the vehicle, and having a first articulation point on said axle housing at a position lower than said wheel center;
   a front lateral link extending generally transversely with respect to the vehicle body, as viewed in the normal forward driving direction of the vehicle, and having a second articulation point on said axle housing at position lower than said wheel center;
   a rear lateral link extending generally transversely and disposed rearwardly of said front lateral link, as viewed in the normal forward direction, and having a third articulation point on said axle housing at position lower than said wheel center;
   an upper arm articulated to said axle housing at a position higher than said wheel center;
   a spring disposed on said rear lateral link for bearing weight of the vehicle body; and
   a stablizer having a fifth articulation point on said axle housing and arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

51. In a wheel suspension for rear wheels of an automotive vehicle having a vehicle body, comprising:
   an axle housing rotatably carrying each of the rear wheels and having a wheel center;
   a radius rod extending forwardly and inwardly, an viewed in a normal forward driving direction of the vehicle, and having a first articulation point on said axle housing at a position lower than said wheel center;
   a front lateral link extending generally transversely with respect to the vehicle body, as viewed in the normal forward driving direction of the vehicle, and having a second articulation point on said axle housing at position lower than said wheel center;
   a rear lateral link extending generally transversely and disposed rearwardly of said front lateral link, as viewed in the normal forward direction, and having a third articulation point on said axle housing at position lower than said wheel center;
   an upper arm articulated to said axle housing at a position higher than said wheel center;
   a spring disposed on said rear lateral link for bearing weight of the vehicle body and
   a shock absorber, with a shock absorber logitudinal axis, having at a lower end portion thereof a fourth articulation point on said axle housing, said shock absorber having an upper end portion for connection to the vehicle body,
   the improvement wherein
   said spring is disposed on said rear lateral link; and
   said shock absorber is so arranged as to provide an arrangement wherein, viewing said axle housing in a transverse direction with respect to the nomral forward driving direction of the vehicle, a distance between said shock absorber axis and said wheel center is shorter than a distance between said third articulation point, wherei said rear link is connected to said axle housing and said wheel center.

52. In a wheel suspension for rear wheels of an automotive vehicle having a vehicle body, comprising axle housing at a second portion thereof on said lower side thereof;

a rear lateral link disposed rearwardly of said front lateral link with respect to a longitudinal direction of the vehicle body and pivotally connected to said axle housing at a third portion thereof on said lower side thereof;

an upper arm pivotally connected to said axle housing on an upper side thereof;

a spring acting on said axle housing for bearing weight of the vehicle body; and a shock absorber, with a shock absorber axis, having a lower end portion connected to said axle housing at a fourth portion thereof, said shock absorber having an upper end portion for connection to the vehicle body, the improvement wherein said spring is disposed on said rear lateral link; and said shock absorber is so arranged as to provide an arrangement wherein, viewing said axle housing in a lateral direction of the automotive vehicle, said shock absorber axis passes through a predetermined spherical volume about said wheel center.

53. In a rear wheel suspension for an automotive vehicle having a vehicle body, comprising:

an axle housing rotatably carrying each of the rear wheels and having a wheel center;

a radius rod extending forwardly and inwardly, as viewed in a normal forward driving direction of the vehicle, and having a first articulation point on said axle housing at a position lower than said wheel center;

a front lateral link extending generally transversely with respect to the vehicle body, as viewed in the normal forward driving direction of the vehicle, and having a second articulation point on said axle housing at position lower than said wheel center;

a rear lateral link extending generally transversely and disposed rearwardly of said front lateral link, as viewed in the normal forward direction, and having a third articulation point on said axle housing at position lover than said wheel center;

an upper arm articulated to said axle housing at a position higher than said wheel center;

a spring disposed on said rear lateral link for bearing weight of the vehicle body;

a shock absorber, with a shock absorber logitudinal axis, having at a lower end portion thereof a fourth articulation point on said axle housing, said shock absorber having an upper end portion for connection to the vehicle body;

to the improvement wherein said spring is disposed on said rear lateral link; and a stablizer has a fifth articulation point on said axle housing and is arranged such that, when a force is applied to said axle housing owing to action of said spring, said stabilizer is stressed to apply a reaction force to said axle housing at said fifth articulation point located forwardly of said wheel center as viewed in the nomral forward direction of the vehicle.

* * * * *